April 23, 1940.   P. F. MARTIN   2,198,122
VALVE
Filed March 13, 1939
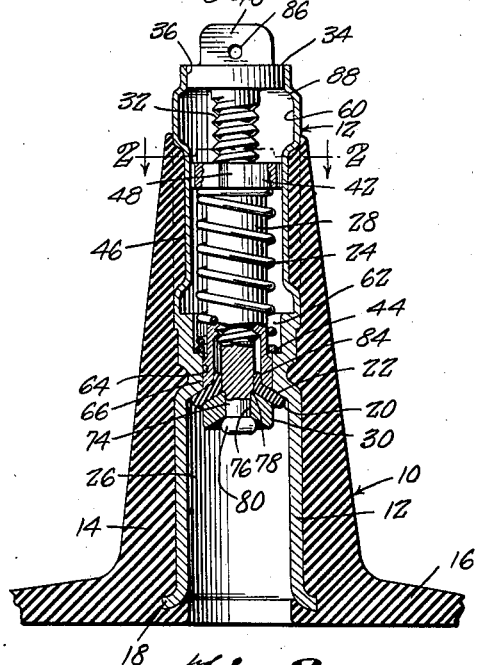
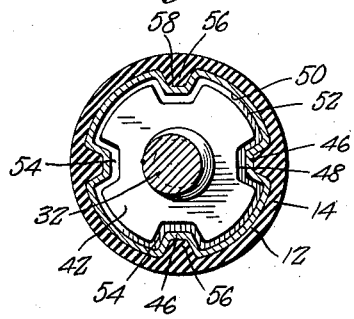
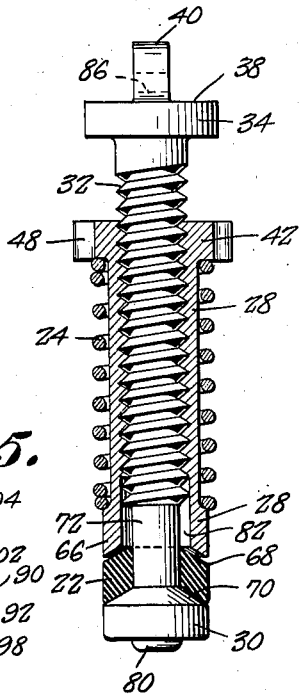
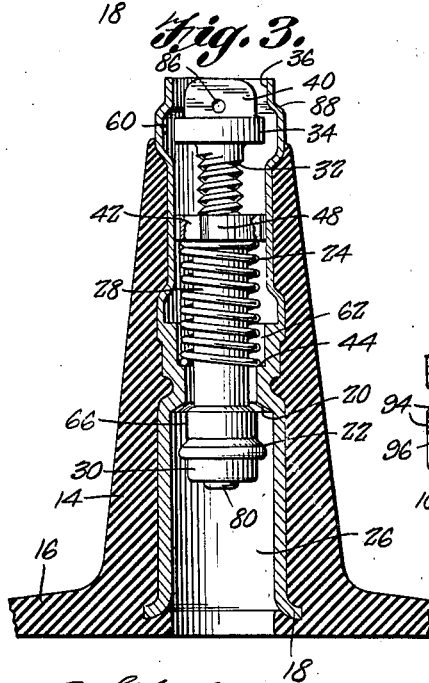
Peter F. Martin,
INVENTOR
BY Victor J. Evans & Co.
ATTORNEYS Patented Apr. 23, 1940

2,198,122

UNITED STATES PATENT OFFICE 2,198,122

VALVE

Peter F. Martin, South Ozone Park, N. Y.

Application March 13, 1939, Serial No. 261,603

8 Claims. (Cl. 277—42)

My invention relates to pneumatic tires, and has among its objects and advantages the provision of an improved tire valve.

Conventional tire valves embody a stem structure provided with a depressible valve element moved to an open position through application of the air hose chuck to the stem structure. While manipulation of the air hose chuck is a relatively simple matter which may be performed speedily, such valves are so designed as to retard the flow of air through the valves, thus greatly prolonging the time required for passing a given volume of air through the valves for inflating or deflating purposes. In repairing inner tubes removed from the tire casing, it frequently happens that the tube must be inflated and deflated a number of times. When deflating, the valve element must be depressed and held in a depressed position for a considerable length of time to bleed the air from the tube. Not only is much time lost but the depressible valve element is of such construction and so related to the stem structure as to be difficult to hold in a depressed position.

To apply the chuck, it is necessary to remove the usual dust cap threadedly related to the stem structure. Because of their relatively small sizes, such caps are difficult to handle, and it frequently happens that the caps are laid aside and forgotten or dropped. The caps are usually covered with dirt so that the hands become soiled when handling the caps. Manipulation of such caps is an inconvenience under the most favorable of conditions and cause considerable delay in the otherwise simple method of inflating or deflating the tire.

Accordingly, an object of my invention is to provide a valve of the type described wherein novel means are incorporated to facilitate the flow of air through the valve so as to permit the passage of a relatively large volume of air through the valve in a relatively short period of time. In addition, the valve is so designed as to facilitate manual depression of the valve element to expedite deflation of the tire.

A further object is to provide a valve of the type described wherein novel dust closure means are incorporated for coaction with an air hose chuck in such manner as to eliminate the necessity for a removable cap. I design the closure means so as to be applicable to the usual depressible valve element, and means are operatively associated therewith for automatically biasing the valve element to a closed position as the air hose chuck is removed. Similarly, mere application of the air hose chuck to the stem structure moves the depressible valve element to its open position.

In the accompanying drawing:

Figure 1 is a sectional view of a valve in accordance with my invention;

Figure 2 is a sectional view along the line 2—2 of Figure 1;

Figure 3 is a view similar to Figure 1 but illustrating the depressible valve element in an open position;

Figure 4 is a sectional view of the valve element illustrating the manner in which it is associated with its cooperating structure; and Figure 5 is a fragmentary sectional view of a modified form of valve element.

In the embodiment selected to illustrate my invention, the stem structure 10 includes a metallic tubular core 12 housed in a rubber shell 14 having a pad or flap 16 which may be cemented or otherwise secured to the inner tube (not shown). Shell 14 may be moulded upon the core 12, which core includes a flange 18 embedded in the material of the pad 16. Core 12 is fashioned to provide a valve seat 20 against which the valve 22 is urged through the medium of a spring 24. Valve 22 is located in the enlarged bore 26 of the core, which bore has communication with the inner tube.

Valve 22 is anchored between one end of a sleeve 28 and a flange 30 fixedly related to one end of a screw 32 which constitutes a mount and an actuating element for the valve. Sleeve 28 is internally threaded to have threaded connection with the screw 32, and the latter includes a flange 34 having a snug fit with the bore 36 in the upper end of the core 12 which projects a short distance above the upper end of the shell 14. Flange 34 has such close fitting relation with the wall of the bore 36 as to constitute a seal which eliminates the necessity for dust caps such as are used in connection with conventional tire valves. Figure 1 illustrates the normal position of the valve 22 at which time the face 38 of the flange 34 lies substantially flush with the end of the core 12. Flange 34 carries an upstanding rib 40 which constitutes an abutting element for engagement with the air hose chuck when applied to the stem structure for depressing the valve 22 to an open position.

I provide the sleeve 28 with a flange 42 which constitutes an abutment for one end of the compression spring 24, and a shoulder 44 inside the core 12 functions as a ledge for supporting the other end of the spring. Thus the spring 24 urges the sleeve 28 in a direction for bringing the valve 22 into pressure relation with its seat 20. Core 12 is deformed to provide a plurality of longitudinally extending ribs 46, and the flange 34 is fashioned with a plurality of grooves 48 for partly housing the ribs 46 to restrain the flange from relative rotary motion inside the core, but permitting free relative movement longitudinally of the core. Flange 34 is of smaller diameter than the bore run 50 to provide a space 52 between the flange and the wall of the bore for free passage of air. Grooves 48 are also fashioned considerably larger than the ribs 46 so as to provide clearance 54 for the passage of air.

It will be noted in referring to Figure 2 that the shell 14 has ribs 56 moulded into the depressions 58 of the core 12. While the flange 34 fits snugly inside the bore 36, the ribs 46 terminate short of the bore 36 so as to maintain a bore diameter 60 of considerably larger diameter than the flange. Thus when the flange 34 is depressed beneath the bore 36, considerable space will be provided between the peripheral wall of the flange and the wall of the bore diameter 60 for the free passage of air.

Core 12 includes a bore 62 for the reception of the lower end of the compression spring 24, and the core is provided with a bore 64 having snug fitting relation with the sleeve wall 66. However, flange 30 is of such diameter as to be passable through the bore 64, but the valve 22 is of larger diameter than the bore so as to have overlapping relation with the valve seat 20. Figure 4 illustrates the manner in which the valve 22 is assembled with the screw 32 and the sleeve 28 preparatory to being inserted in the core 12 and subsequently compressed to extrude the rubber valve to the requisite diameter. Sleeve 28 includes an angular face 68 paralleling the angular face 70 on the flange 30. Valve 22 is originally in the nature of a rubber washer of considerable thickness through which the shank 72 of the screw is inserted. This shank includes a smaller diameter run 74 and the flange 30 is bored at 76 to fit snugly on the run. The flange engages the shoulder 78 on the shank 72 and the end of the run 74 is riveted at 80 to fixedly connect the flange 30 with the shank.

Figure 4 illustrates the screw 32 assembled with the sleeve 28 and the flange 30 riveted to the shank 72, with the valve 22 positioned between the flange and the adjacent end of the sleeve 28. At this time the outer diameter of the valve 22 is such as to pass freely through the bore 64, so that the structure of Figure 4 constitutes an insert which may be easily inserted in the core 12. Screw 32 and the associated sleeve 28 are depressed inwardly of the core 12 against the tension of the spring 24 sufficiently far to bring the valve 22 below the valve seat 20. A suitable tool is then connected with the rib 40 and the screw 32 rotated relatively to the sleeve 28 to compress the valve 22 and extrude the valve to such diameter as to have overlapping relation with the valve seat 20, as illustrated in Figure 1.

Screw 32 and the sleeve 28 are so related for length with respect to the original thickness of the valve 22 as to extrude the valve to its proper diameter when the screw is turned to such a degree as to bring its face 38 substantially flush with the upper end of the core 12. During extrusion of the valve 22, material of the valve is extruded into the bore 82 of the sleeve 28 to effect an air-tight seal about the shank 72 in the event that there might be some air passage between the shank and the wall of the bore 76 in the flange 30. Figure 1 illustrates such a seal at 84.

In operation, spring 24 urges the valve 22 into seating relation with its seat 20. The convolutions of the spring 24 are so spaced and have such clearance with respect to the sleeve 28 as to provide free passage of air therebetween. Application of the air hose chuck will depress the screw 32 and the sleeve 28 as a unit to move the sleeve run 66 beneath the bore 64 so as to provide free passage for air. The diameter of the sleeve 28 above its run 66 is considerably smaller than the diameter of the bore 64 so as to provide considerable space between the sleeve and the bore. At the same time, bore 26 is of considerably larger diameter than the bore 64 so that the air will flow freely about the valve 22 when it is moved away from its seat 20. While the flange 42 on the sleeve 28 moves freely longitudinally of the core 12, the flange is restrained from relative rotary motion because of the restraining action of the ribs 46, thus permitting the screw 32 to be rotated for effectively compressing and extruding the valve 22. My construction provides free passage of air so that a given volume of air may be passed through the valve in a relatively short period of time. The valve parts are easily assembled in that the parts associated with the core 12 are first assembled as a unit, which unit is easily inserted in the core and effectively connected therewith through mere extrusion of the valve 22.

In addition to providing free passage for the air, flange 34 constitutes a cap having sealing relation with the bore 36 so as to eliminate the necessity for additional dust caps. For repairing purposes, valve 22 may be brought back to its original diameter of Figure 4 by releasing pressure on the valve through rotation of the screw 32, thus permitting withdrawal of the insert of Figure 4 from the core 12. Rib 40 is provided with an opening 86 for the reception of a hook to facilitate withdrawal of the insert. Face 38 constitutes an abutment against which a pin may be pressed when manually opening the valve 22. Core 12 includes an angular neck 88 which effectively cams the flange 34 into the bore 36 as the flange is returned to its normal position.

In Figure 5, the valve 90, which functionally corresponds to the valve 22, includes an originally conically shaped metallic washer 92 positioned between two similarly shaped rubber washers 94. All the washers are bored for the reception of the shank 96 and are positioned between the flat face 98 of the flange 100 and the flat end 102 on the sleeve 104 which corresponds to the sleeve 28. Shank 96 constitutes an extension of a screw such as that illustrated at 32, so that the washer assembly may be pressed between the faces 98 and 102. Such pressure will flatten the washer assembly and enlarge its diameter to such a degree as to have sufficient overlapping relation with the valve seat 20. Release of pressure on the washer assembly will permit the latter to spring back to its original contour so that the assembly may be withdrawn.

Having thus described certain embodiments of my invention in detail, it is, of course, understood that I do not desire to limit the scope thereof to the exact details set forth except in so far as those details may be defined in the appended claims.

I claim:

1. A valve comprising a tubular stem provided with an annular seat, a valve element normally engaging said seat, an actuating member for the valve element, resilient means cooperable on the tubular stem and the actuating member for urging the valve element against said seat, said valve element including a resilient body of an original diameter passable through the annular seat, said actuating member including a sleeve, a screw threaded in the sleeve and having an abutment, and said resilient body being positioned between one end of the sleeve and said abutment, to be compressed through relative rotation of the sleeve and the screw for increasing its diameter in such degree as to provide a seat engaging face.

2. A valve comprising a tubular stem provided with an annular seat, a valve element normally engaging said seat, an actuating member for the valve element, resilient means cooperable on the tubular stem and the actuating member for urging the valve element against said seat, said valve element including a resilient body of an original diameter passable through the annular seat, said actuating member including a sleeve, a screw threaded in the sleeve and having an abutment, said resilient body being positioned between one end of the sleeve and said abutment, to be compressed through relative rotation of the sleeve and the screw for increasing its diameter in such degree as to provide a seat engaging face, and means for keying the sleeve for relative movement longitudinally of the tubular stem but permitting fluid to flow therebetween.

3. A tire valve comprising a tubular stem provided with a guide bore and having an annular seat at one end of the guide bore, a valve element normally engaging said seat, an actuating member for the valve element having a sliding fit with the guide bore and a fluid passage run, resilient means cooperable on the actuating member and the tubular stem for urging the valve element against said seat, said actuating member being movable for unseating the valve element and bringing the fluid passage run inside the guide bore, to permit passage of fluid through the guide bore, said valve element including a resilient body of an original diameter passable through the annular seat, and means for expanding the resilient body for increasing its diameter to provide a seat engaging face.

4. A tire valve comprising a tubular stem provided with a guide bore and having an annular seat at one end of the guide bore, a valve element normally engaging said seat, an actuating member for the valve element having a sliding fit with the guide bore and a fluid passage run, resilient means cooperable on the actuating member and the tubular stem for urging the valve element against said seat, said actuating member being movable for unseating the valve element and bringing the fluid passage run inside the guide bore, to permit passage of fluid through the guide bore, said valve element including a resilient body of an original diameter passable through the annular seat, said actuating member including a sleeve, and a screw threaded through the sleeve and having an abutment, said resilient body being positioned between one end of the sleeve and the abutment, to be compressed through relative rotation of the screw and the sleeve for increasing its diameter to provide a seat engaging face.

5. A tire valve comprising a tubular stem provided with a guide bore and having an annular seat at one end of the guide bore, a valve element normally engaging said seat, an actuating member for the valve element having a sliding fit with the guide bore and a fluid passage run, resilient means cooperable on the actuating member and the tubular stem for urging the valve element against said seat, said actuating member being movable for unseating the valve element and bringing the fluid passage run inside the guide bore, to permit passage of fluid through the guide bore, said valve element including a resilient body of an original diameter passable through the annular seat, said actuating member including a sleeve, a screw threaded through the sleeve and having an abutment, said resilient body being positioned between one end of the sleeve and the abutment, to be compressed through relative rotation of the screw and the sleeve for increasing its diameter to provide a seat engaging face, and key means cooperable on the sleeve and the tubular stem for restraining the sleeve from relative rotation inside the tubular stem, but permitting relative longitudinal movement.

6. A tire valve comprising a tubular stem provided with a guide bore and having an annular seat at one end of the guide bore, a valve element normally engaging said seat, an actuating member for the valve element having a sliding fit with the guide bore and a fluid passage run, resilient means cooperable on the actuating member and the tubular stem for urging the valve element against said seat, said actuating member being movable for unseating the valve element and bringing the fluid passage run inside the guide bore, to permit passage of fluid through the guide bore, said valve element including a resilient body of an original diameter passable through the annular seat, said actuating member including a sleeve, a screw threaded through the sleeve and having an abutment, said resilient body being positioned between one end of the sleeve and the abutment, to be compressed through relative rotation of the screw and the sleeve for increasing its diameter to provide a seat engaging face, key means cooperable on the sleeve and the tubular stem for restraining the sleeve from relative rotation inside the tubular stem, but permitting relative longitudinal movement, said sleeve and the key means having a loose fit inside the tubular stem to provide a free air passage, and said valve element being movable to a wide open position.

7. A tire valve comprising a tubular stem provided with a guide bore and having an annular seat at one end of the guide bore, a valve element normally engaging said seat, an actuating member for the valve element having a sliding fit with the guide bore and a fluid passage run, resilient means cooperable on the actuating member and the tubular stem for urging the valve element against said seat, said actuating member being movable for unseating the valve element and bringing the fluid passage run inside the guide bore, to permit passage of fluid through the guide bore, said valve element including a resilient body of an original diameter passable through the annular seat, said actuating member including a sleeve, a screw threaded through the sleeve and having an abutment, said resilient body being positioned between one end of the sleeve and the abutment, to be compressed through relative rotation of the screw and the sleeve for increasing its diameter to provide a seat engaging face, key means cooperable on the sleeve and the tubular stem for restraining the sleeve from relative rotation inside the tubular stem, but permitting relative longitudinal movement, and a closure cap carried by the screw for closing one end of the tubular stem.

8. A valve comprising a tubular stem provided with an annular seat, a valve element normally engaging said seat, an actuating member for the valve element, resilient means cooperable on the tubular stem and the actuating member for urging the valve element against said seat, said valve element including a resilient metallic disc and resilient pads on the disc of original diameters passable through the annular seat, and means for distorting all the discs for expanding the same to such diameter as to provide a seat engaging face.

PETER F. MARTIN.